United States Patent
Campbell et al.

(10) Patent No.: US 8,046,179 B2
(45) Date of Patent: Oct. 25, 2011

(54) POWER CONVERTER DISABLE VERIFICATION SYSTEM AND METHOD

(75) Inventors: Alan J Campbell, New Berlin, WI (US); Steven Terry Seidlitz, Brookfield, WI (US); Rangarajan M Tallam, Germantown, WI (US); Alex Yegorov, Mequon, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 447 days.

(21) Appl. No.: 12/245,992

(22) Filed: Oct. 6, 2008

(65) Prior Publication Data

US 2010/0088047 A1 Apr. 8, 2010

(51) Int. Cl.
*G06F 19/00* (2011.01)
*H02P 3/00* (2006.01)
*G05F 1/40* (2006.01)

(52) U.S. Cl. .................... 702/58; 318/491; 323/282

(58) Field of Classification Search .................... 702/58; 318/491; 327/108; 323/282; 361/103
See application file for complete search history.

(56) References Cited

U.S. PATENT DOCUMENTS 7,486,117 B2 * 2/2009 Yanagihara ............. 327/108
2008/0312855 A1 * 12/2008 Monti et al. ............. 702/64

* cited by examiner

*Primary Examiner* — Bryan Bui
(74) *Attorney, Agent, or Firm* — Fletcher Yoder LLP; Alexander R. Kuszewski; John M. Miller (57) ABSTRACT

A power electronics device with an improved IGBT protection mechanism is provided. More specifically, systems and methods are provided for shortening the duration of a shutdown test pulse, such that the power output to the load is substantially unaffected.

22 Claims, 6 Drawing Sheets

POWER CONVERTER DISABLE VERIFICATION SYSTEM AND METHOD

BACKGROUND

The invention relates generally to the field of electrical power converters and inverters. More particularly, the invention relates to techniques for verifying that a disable circuitry of a power converter or inverter is functioning properly.

Power inverters and converters typically employ power modules to create a desired output voltage waveform, which is used to power various devices, such as motors and other equipment. The frequency and amplitude of the output waveform may affect the operation of the device such as by changing the speed or torque of a motor, for example. Some power modules create the desired output waveform through pulse width modulation, wherein power semiconductor switches such as insulated gate bipolar transistors (IGBTs) are caused to switch rapidly on and off in a particular sequence so as to create an approximately sinusoidal output waveform.

In certain circumstances it may be necessary to disable the power module. Therefore a variety of methods exist for powering down power modules, depending on the level of disruption that may be considered acceptable under the circumstances. For example, in some cases, it may be sufficient to simply decouple the power module from its power source. However, doing so may also power down other power module circuitry that may be useful even though power is not being delivered to the load. Furthermore, the time and effort used to bring the power module back to a fully operational state may be extensive. Therefore, it may be useful in some circumstances to disable certain circuitry within the power module that will prevent the power module from outputting power to the load while maintaining the operability of certain monitoring and control functions. In this way, useful functions of the power module be used while the output power to the load is disabled. Additionally, the power module may be brought back to a fully operational state more quickly if only a portion of the circuitry is disabled.

In cases where only a portion of the power module circuitry will be disabled, techniques are usually employed to ensure that the shutdown circuitry will operate properly when engaged. For example, a verification circuit may be used to periodically test the shutdown circuitry. The shutdown test may, however, tend to stress the power module circuitry or the load device, possibly leading to device failure.

To meet some industry requirements for circuitry designed to shut down motor drives and other power equipment, the ability to test the shut-down capabilities of the disabling equipment may be required. For example, to comply with what are currently the most stringent requirements, the disabling circuitry must be capable of demonstrating its ability to shut down power to loads during real time operation of the equipment. Here again, however, such actual loss of power can perturb production equipment, and degrade the equipment. For pulsed motor drives, for example, rapid interruption and re-initiation of a pulse train powering the load can cause high potential differences within and between phase conductors that can lead to degradation of insulating systems, and eventually to failure of the motor or other system component.

It may be advantageous, therefore, to provide a system and method of testing a shutdown circuitry that is less disruptive of the normal operation of the power module.

BRIEF DESCRIPTION

The present invention relates generally to systems and methods of verifying the proper operation of a shutdown circuitry. Embodiments include systems and methods of shortening the duration of a test pulse used to verify the operability of a shutdown circuit.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Embodiments of the present invention relate to reducing or eliminating the electrical stress on motor windings due to a shutdown test pulse from the motor control circuitry that verifies the operability of a shutdown circuitry used for powering down the motor. In the embodiments described below, pulse width modulation is used to drive an inverter module for delivering power to the motor. The inverter module includes a set of solid state switches, such as IGBTs that are rapidly switched on and off to create an approximately sinusoidal waveform at the output of the inverter. Because the motor is inductive, currents continue to flow even when the power module is disabled by the shutdown test pulse, which can result in the pulsed voltage output changing polarity instantaneously. At the end of the shutdown test pulse, when the power module is enabled, the voltage output can reverse polarity again. Voltage polarity reversals in quick succession could result in a high voltage spike on the motor that may tend to damage motor winding insulation. To avoid this, present embodiments use a shutdown test pulse that is short enough in duration, that the output power from the inverter circuitry remains substantially unaffected.

Figure 1:
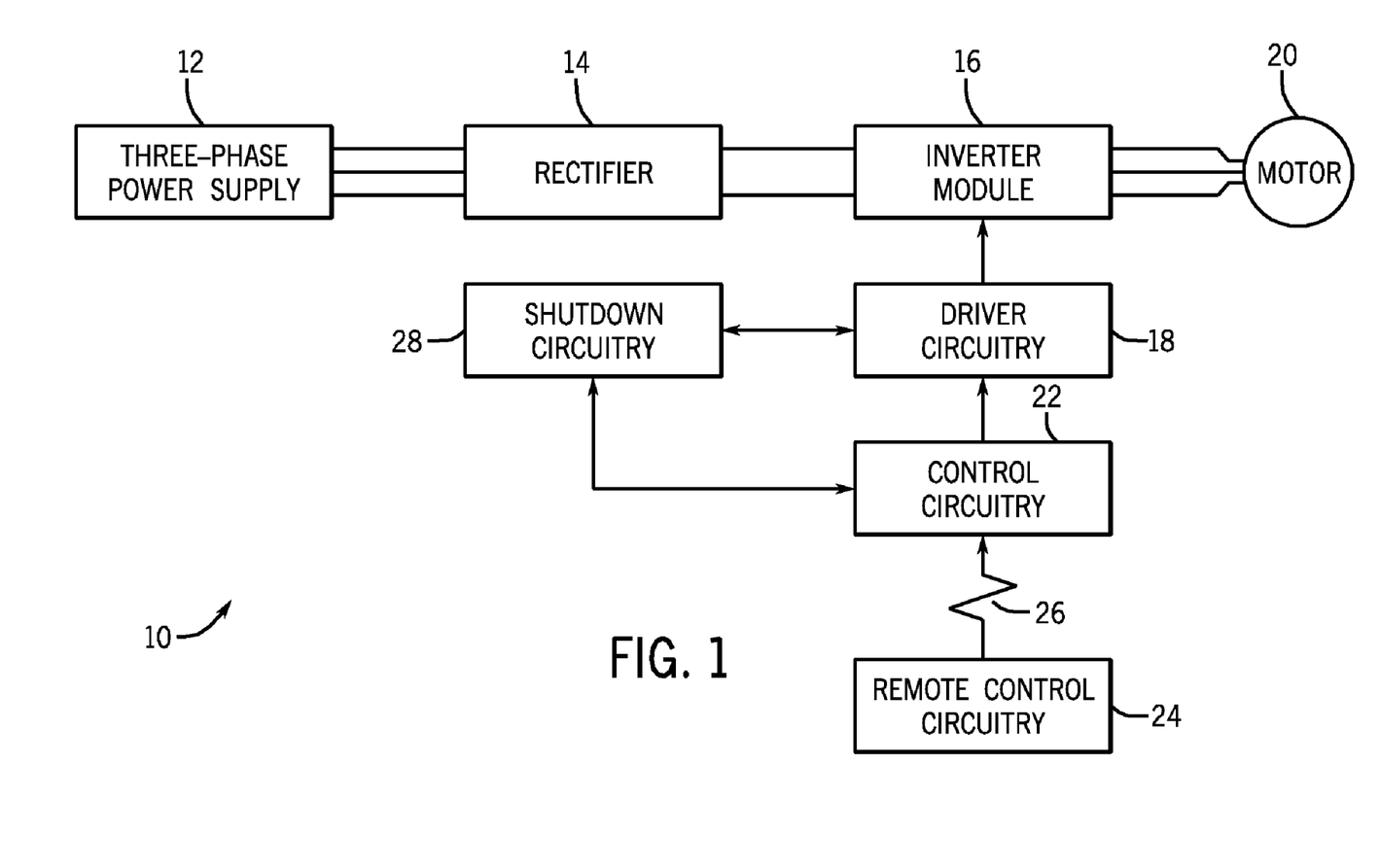
FIG. 1 is a block diagram of a motor control system employing shutdown circuitry with improved methods of verifying the operability of the shutdown circuitry.

FIG. 1 illustrates an exemplary motor control system 10 employing shutdown circuitry with improved methods of verifying the operability of the shutdown circuitry. A three-phase power supply 12 provides a three-phase voltage waveform at a constant frequency to a rectifier 14, and may be derived from a generator or from an external power grid. Rectifier 14 performs full wave rectification of the three phase voltage waveform, outputting a direct current (DC) voltage to an inverter module 16.

Inverter module 16 accepts the positive and negative lines of DC voltage from the rectifier circuitry 14 and outputs a discretized three phase waveform at a desired frequency, independent of the frequency of three-phase power supply 12. Driver circuitry 18 provides inverter module 16 with appropriate signals, enabling inverter module 16 to output the waveform. The resulting three-phase waveform may thereafter drive a load, such as a motor 20.

Control circuitry 22 may receive commands from remote control circuitry 24, using such commands to enable driver circuitry 18 to properly control inverter module 16. The control circuitry 22 and the driver circuitry 18 may be coupled to a shutdown circuitry 28 that enables the motor control system to power down the motor 20. The shutdown circuitry 28 may power down the motor 20 by disabling the driver circuitry 18. In some circumstances, the safety circuitry 28 may power down the motor 20 in response to a signal from the control circuitry 22. For purposes of the present application, the term "full shutdown" is used to describe the situation in which the output power to the motor is turned-off. After a full shutdown, the output power to the motor may remain off until powered back up by the user.

To ensure that the driver circuitry 18 will respond appropriately to the full shutdown command from the shutdown circuitry 28, the shutdown circuitry 28 may periodically verify the operability of the shutdown operation by initiating a shutdown diagnostic test, which will be described below in relation to FIG. 5. In response to the shutdown diagnostic test, the driver circuitry 18 may send a return signal to the safety circuitry 28 to indicate whether the shutdown diagnostic test was successful. If the shutdown diagnostic test fails, the safety circuitry may send a command to the control circuitry 22 to disable the driver circuitry 18. In some embodiments, the shutdown diagnostic test may be repeated at approximately 250 millisecond intervals.

Figure 2:
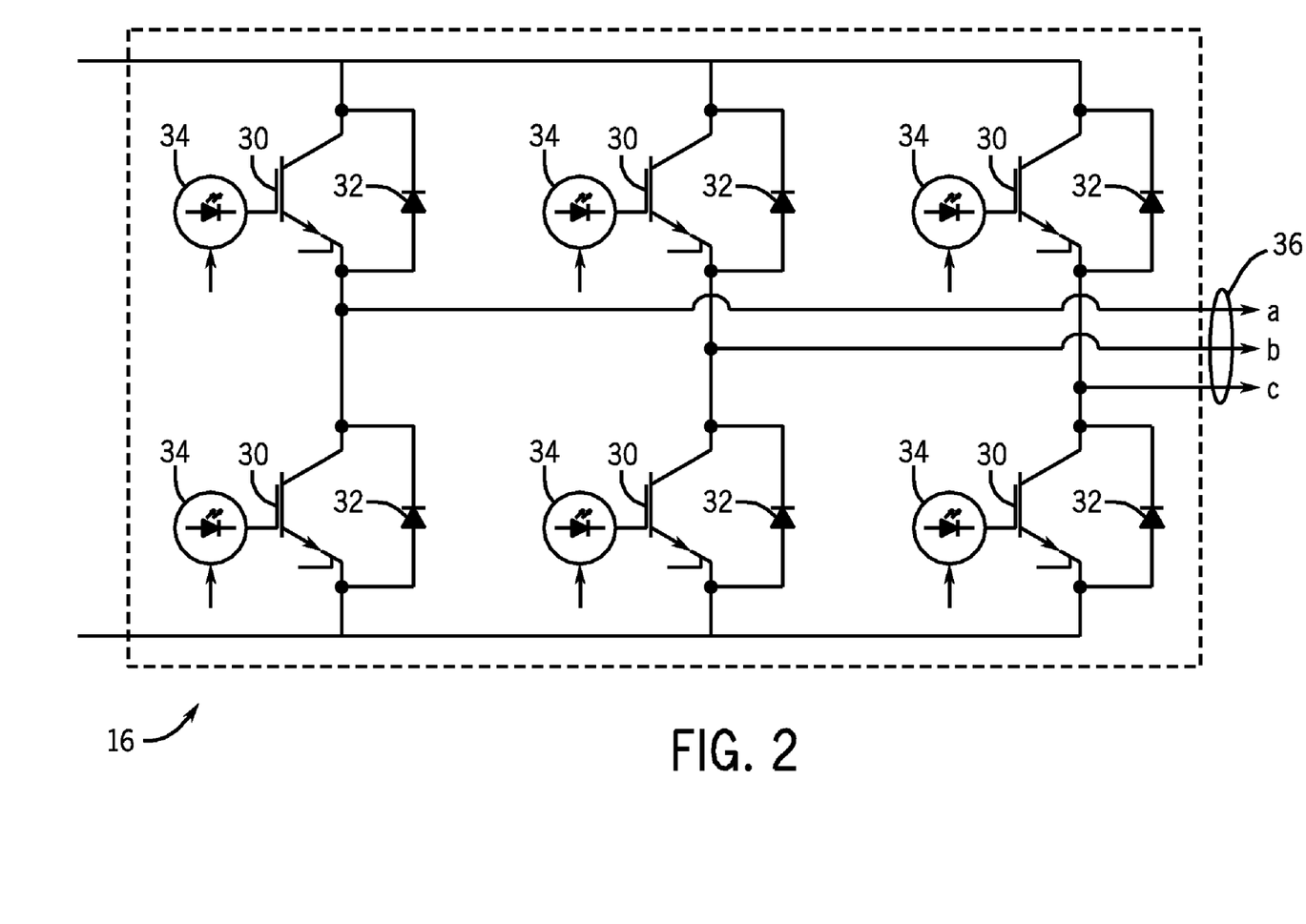
FIG. 2 is a circuit diagram illustrating an inverter module of the motor control system of FIG. 1.

FIG. 2 is a simplified circuit diagram illustrating an inverter module of the motor control system of FIG. 1. As discussed above, the inverter module 16 may include IGBTs 30 for generating the output power waveform. Because the motor 20 is inductive, a voltage spike may occur on the IGBTs 30 when they are disabled, as currents continue to flow. Therefore, to protect the IGBTs 30 from voltage spikes, the inverter module 16 may include freewheeling diodes 32 in parallel with the IGBTs 30 to provide a path for current flow, when the IGBTs 30 are disabled. The inverter module 16 may also include opto-couplers 34 to provide electrical isolation between the driver circuitry 18 and the input of the IGBTs 30.

During operation of the inverter 16, the opto-couplers 34 will receive a series of input pulses from the driver circuitry 18 to generate the output waveform on the motor windings. In some embodiments, the input pulses may be approximately 2 micro-seconds in duration. The opto-couplers may exhibit a latency period that causes a delay between the state change of the input pulse and the state change of the opto-coupler output. The latency period of the opto-couplers may be relatively short compared to the duration of the input pulses. In some embodiments, the latency period may be approximately 200 nano-seconds. During the shutdown diagnostic test, the driver circuitry 18 may be temporarily disabled by a shutdown test pulse. As such, the input signals received by the opto-couplers 34 from the driver circuitry 18 may temporarily drop from a high voltage state to a low voltage state. In embodiments of the present invention, the duration of the shutdown test pulse will be short compared to the latency period of the opto-couplers 34. In this way, the output of the opto-couplers 34 will remain substantially unaffected by the shutdown test pulse, and the inverter module may continue to generate output power to the motor 20 substantially unaffected by the shutdown test pulse. In some embodiments, the shutdown test pulse may be approximately 50 to 150 nano-seconds in duration.

Figure 3:
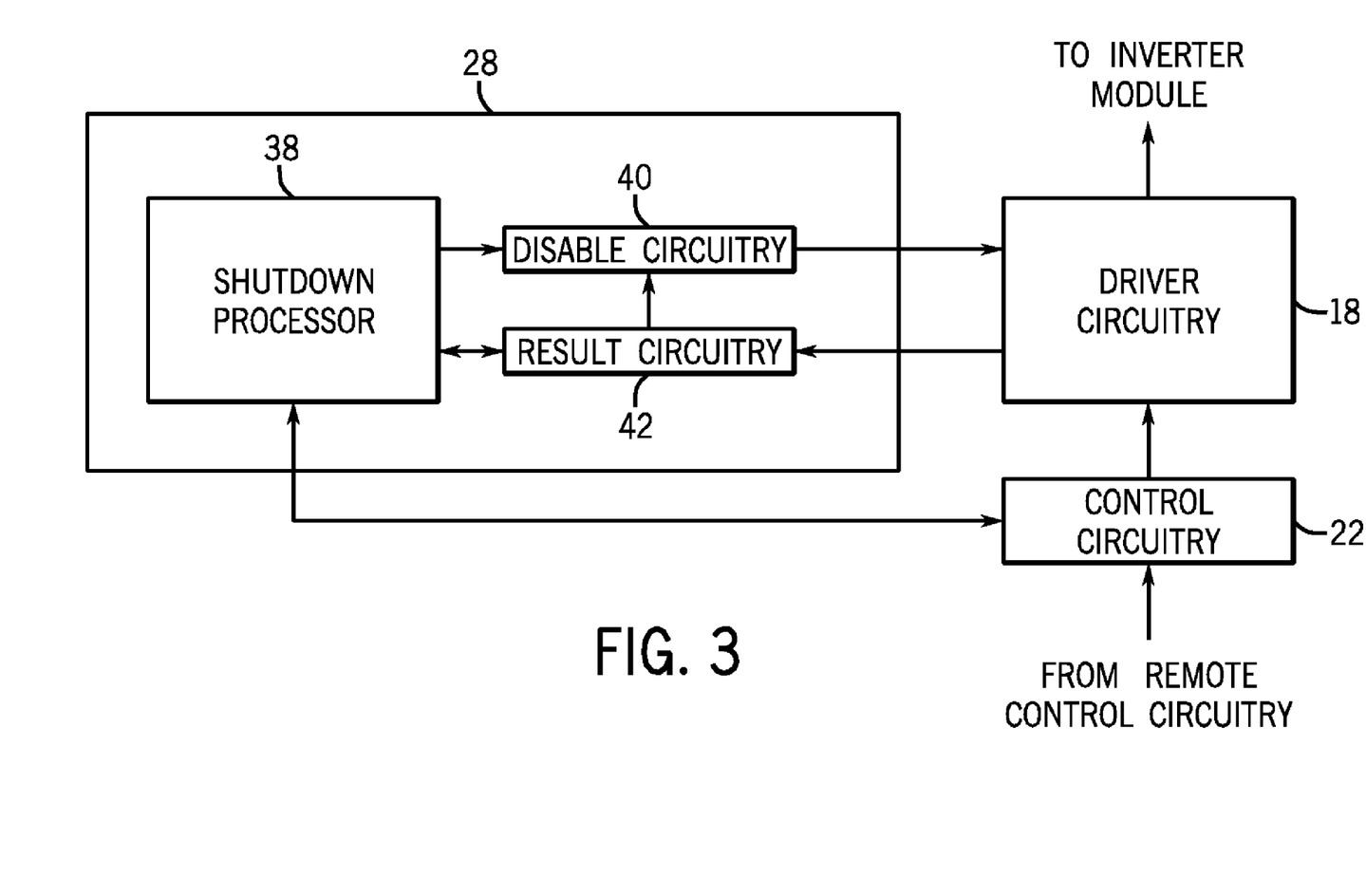
FIG. 3 is a circuit diagram of a shutdown circuitry with improved methods of verifying the operability of the shutdown circuitry.

FIG. 3 is a simplified circuit diagram of a shutdown circuitry that provides the short duration shutdown test pulse described above. As shown in FIG. 3 the shutdown circuitry 28 includes a shutdown processor 38 that controls both a full shutdown procedure and the shutdown diagnostic test. The shutdown circuitry may be communicatively coupled to the control circuitry 22. In some embodiments, the control circuitry 22 may command the shutdown processor to initiate the full shutdown and/or the shutdown diagnostic test. The shutdown processor may also send data back to the control circuitry 22 informing the control circuitry 22 of the success of the full shutdown or the shutdown diagnostic test.

To increase the speed of the shutdown diagnostic test, the shutdown circuitry also includes a disable circuitry 40 and a result circuitry 42. The disable circuitry 40 may respond to a shutdown command from the shutdown processor 38 by sending a signal to the driver circuitry 18 that disables the driver circuitry 18. The result circuitry 42 receives a signal from the driver circuitry 18 regarding whether the driver circuitry 18 is enabled or disabled, and transmits this signal back to the shutdown processor 38. In the case of a shutdown diagnostic test, the driver circuitry 18 is disabled for only a short time, as discussed above. Therefore, shortly after the disable circuitry 40 sends the disable command to the driver circuitry 18, the disable circuitry 40 then sends an enable signal to the driver circuitry 18. The time period between the disable signal and the enable signal may be to short for the shutdown processor 38 to accomplish by itself. Therefore, to accomplish the quick re-enabling of the driver circuitry 18, the result circuitry 42 sends a power-up command to the disable circuitry 40 soon after receiving an indication from the driver circuitry 18 that the driver circuitry 18 is indeed disabled. The power-up command from the result circuitry 42 over-rides the shutdown command from the shutdown processor 38, causing the disable circuitry 40 to re-enable the driver circuitry 18. The result is that the driver circuitry 18 experiences a short shutdown test pulse. In this way, the driver circuitry 18 may be re-enabled before the shutdown processor 38 has had time to process the results of the shutdown diagnostic test. Meanwhile, the result circuitry 42 stores the results of the shutdown diagnostic test long enough for the shutdown processor 38 to process the results.

If the shutdown diagnostic test is successful, the control circuitry 22 continues sending drive signals to the driver circuitry 18, and the driver circuitry 18 continues to drive the inverter module 16. If, however, the shutdown diagnostic test is unsuccessful, the shutdown processor 38 may send a command to the control circuitry 22 indicating that the shutdown circuitry 28 was unable to disable the driver circuitry 18, in which case, the control circuitry 22 may stop sending drive signals to the driver circuitry 18.

Figure 4:
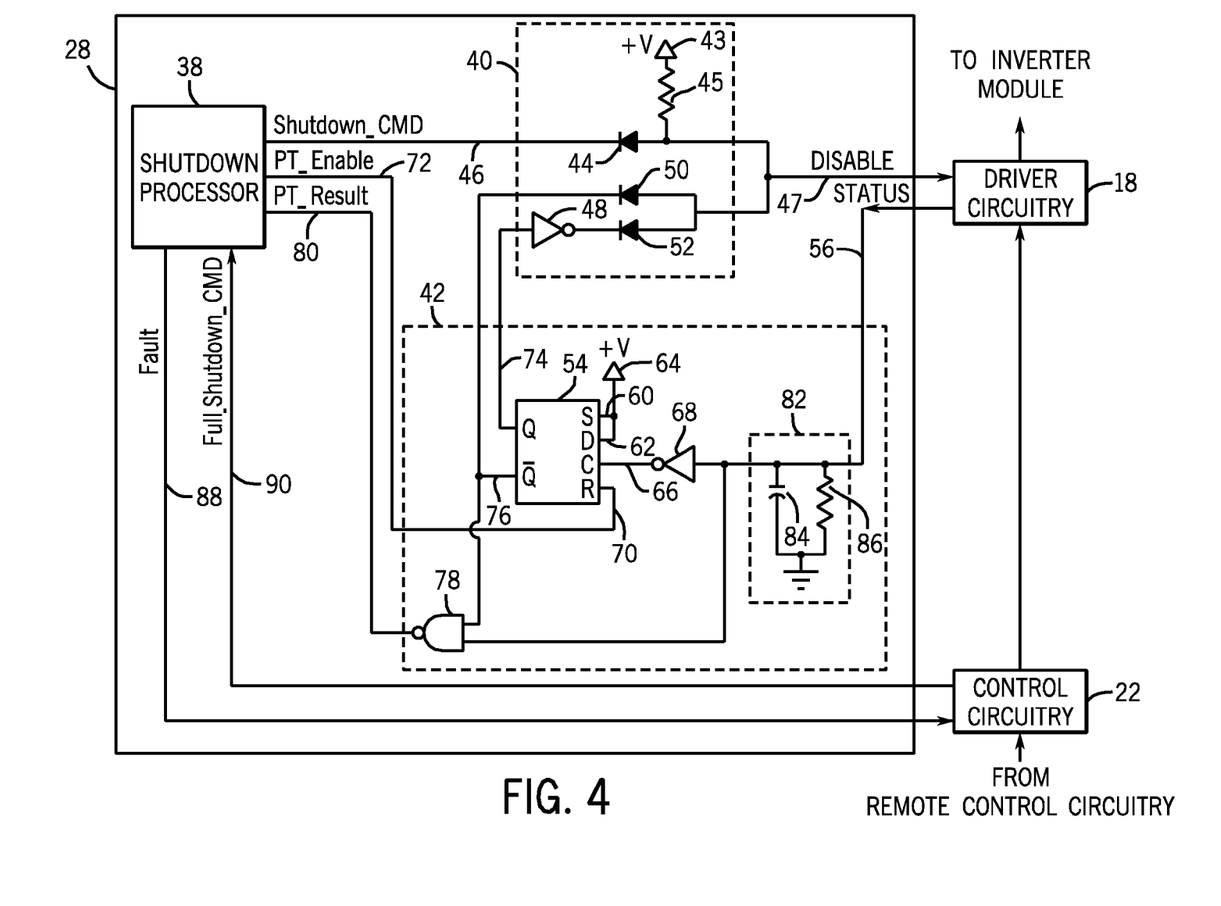
FIG. 4 is a detailed circuit diagram of one embodiment of the shutdown circuitry of FIG. 3.

FIG. 4 is a detailed circuit diagram of one embodiment of the shutdown circuitry 28 described in relation to FIG. 3. As shown in FIG. 3, the disable circuitry may include a diode 44 that transfers a shutdown command from a shutdown-command output 46 of the shutdown processor 38 to a disable input 47 of the driver circuitry 18. The disable circuitry 40 may also include an inverter 48 and a set of diodes 50 and 52 configured to respond to the result circuitry 42 to override the shutdown command from the shutdown processor 38 and re-enable the driver circuitry 18. The anode of each of the diodes 44, 50 and 52 are coupled to the disable input 47 of the driver circuitry 18 and to a positive voltage 43 through a pull-up resistor 45. Together, the diode 44 and diodes 50 and 52 provide an "AND" function that operates on the shutdown command from the shutdown processor 38 and the output of the result circuitry 42. In some embodiments, the diodes 44, 50 and 52 may be Schottky diodes.

The result circuitry 42 may include a latch 54 coupled to the status output 56 of the driver circuitry 18 through an inverter 68 to receive and store the status signal from the driver circuitry 18. In some embodiments, the latch 54 may be a D-type flip-flop. As shown in FIG. 4, both the "set" input 60 and the "data" input 62 are coupled to a positive voltage 64 to provide a logical-one input, the "clock" input 66 is coupled to the status output 56 of the driver circuitry 18 through the inverter 68, and the "reset" input 70 is coupled to the pulse-test-enable output 72 of the shutdown processor 38. The outputs of the latch 54, herein referred to as "output 74" and "inverted output 76" are coupled to the disable circuitry 40. Specifically, output 74 is coupled to the cathode of diode 52 through the inverter 48, and the inverted output 76 is coupled to the cathode of diode 50. Additionally, the inverted output 76 is also coupled to a two-input NAND gate 78. The other input of the NAND gate 78 is coupled to the status output 56 of the driver circuitry 18. The output of the NAND gate 78 is coupled to the pulse-test-result input 80 of the shutdown processor 38 to relay the status of the driver circuitry 18 back to the shutdown processor. Additionally the result circuitry 42 may also include a pulse conditioning circuit 82 that determines, in part, the duration of the shutdown test pulse. In some embodiments, the pulse conditioning circuit 82 may include an RC circuit such as a parallel RC circuit. As such, the pulse conditioning circuit 82 may include a capacitor 84 and a resistor 86 coupled in parallel to ground.

The shutdown processor 38 may also include a fault output 88 that may send a fault signal to the control circuitry 22 if a shutdown diagnostic test fails. Additionally, the shutdown processor 38 may also include a full-shutdown-command input 90 that may receive a command from the control circuitry 22 to initiate a full shutdown.

Figure 5:
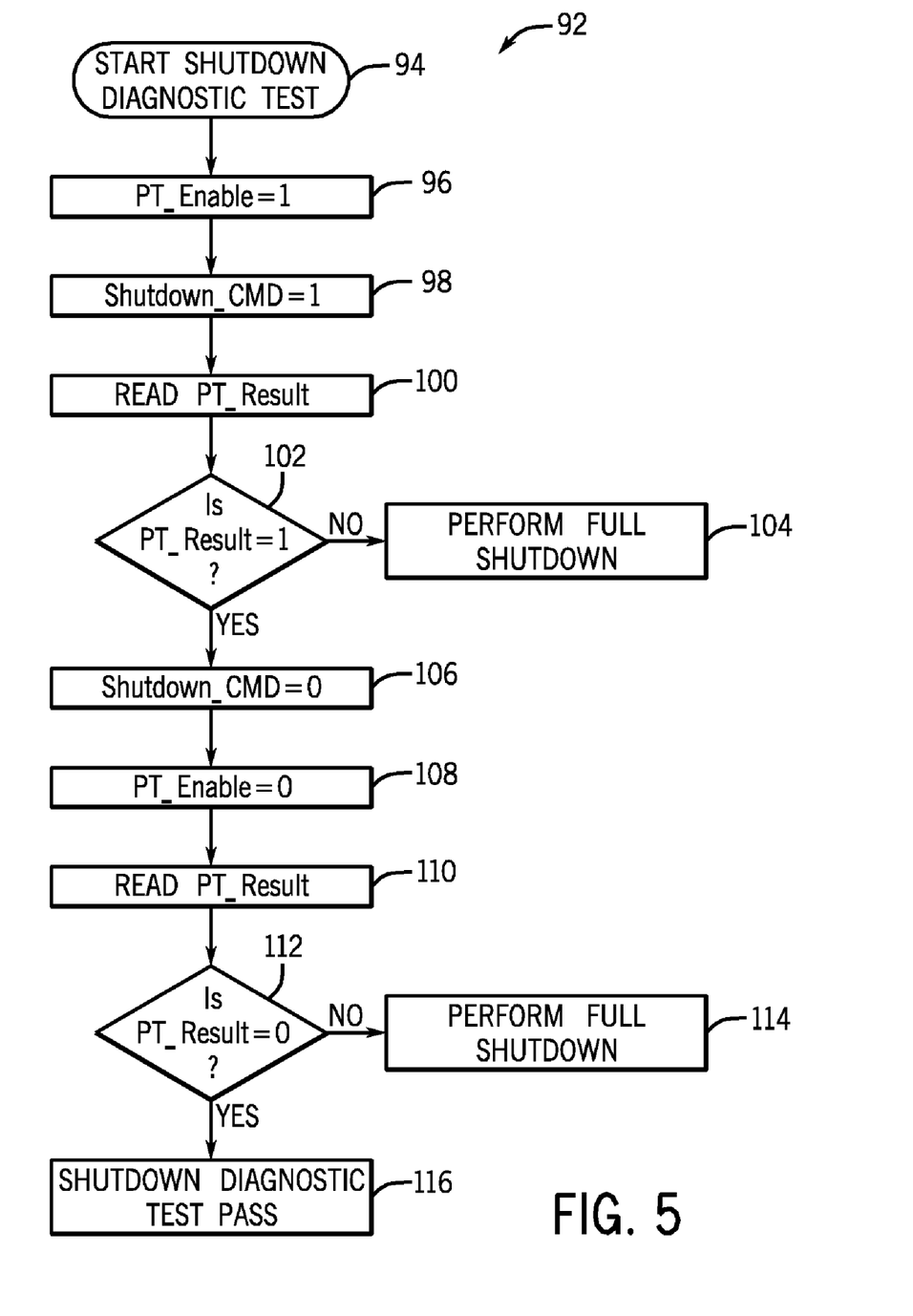
FIG. 5 is a simplified flow chart showing a method of operating the shutdown circuitry of FIG. 4.

Operation of the shutdown circuitry 28 described above may be better understood with reference to FIG. 5, which describes an exemplary method of conducting a shutdown diagnostic test. In some embodiments, the shutdown diagnostic test may be a two part test, wherein different operational characteristics of the shutdown circuitry 28 are verified. In the embodiment shown in FIG. 5, steps 96 through 102, are used to verify the ability of the shutdown circuitry 28 to disable the driver circuitry 18, and steps 106 to 112 are used to verify the ability of the shutdown circuitry 28 to reset.

Process 92 starts at step 94, wherein the shutdown circuitry 28 is initialized. During step 94 the pulse-test-enable output 72 is set to logical zero, thereby resetting the latch 54 and causing the output (i.e. cathode) of the diodes 50 and 52 to be at the logical-one voltage. Additionally, the shutdown-command output 46 is set to logical-zero, and the status output 56 will equal logical-one, indicating that the driver circuitry 18 is enabled.

Next, at step 96, the pulse-test-enable output 72 is set to logic one, thereby allowing the latch 54 to respond to the status output 56 of the driver circuitry 18. Next, at step 98, the shutdown-command output is set to logical one, thereby signaling the driver circuitry 18 to shut down. If the driver circuitry 18 does shut down as commanded, status output 56 will go to logical zero, causing the output of the NAND gate 78 and the pulse-test-result input 80 to go to logical one, indicating to the shutdown processor 38 that the driver circuitry 18 did indeed shutdown.

Additionally, if the driver circuitry 18 shuts down and the status output 56 drops to logical zero, the clock input 60 to the latch 54 will go from zero to one. The rising edge of the clock input 60 signal causes the latch 54 to change state. Specifically, the output 74 goes to one and the inverted output 76 goes to zero, causing both outputs of the diodes 50 and 52 to drop to a low voltage, thereby pulling the disable input 47 from high to low and overriding the shutdown command from the shutdown processor 38.

Because the driver circuitry 18 is quickly re-enabled, the driver circuitry 18 experiences a short duration test pulse, as described above. The duration of the test pulse may be the sum of the time delays provided by the driver circuitry 18, the pulse conditioning circuitry 82, the latch 54, and the inverters 48 and 68. Additionally, the pulse conditioning circuitry 82 may also add to the duration of the test pulse by delaying the reaction of the latch 54 to the status output 56. By choosing an appropriate capacitor 84, the duration of the pulse may be set to a suitable value.

In addition to re-enabling the driver circuitry 18, the latch 54 also stores the status result from the driver circuitry 18 and relays the status result back to the shutdown processor 38 through the NAND gate 78, allowing the shutdown processor 38 to process the results of the shutdown diagnostic test even after the driver circuitry 18 has already been re-enabled.

Next, at step 100, the shutdown processor 38 reads the pulse-test-result input 80 to determine the success or failure of the shutdown command. At step 102, if the pulse-test-result input 80 equals logical zero, that indicates that the driver circuitry 18 was not disabled, and the process 92 continues to step 104, wherein the shutdown processor 38 initiates a full shutdown. To initiate the full shutdown, the shutdown processor 38 may send a fault signal to the fault output 88, informing the control circuitry 22 that the shutdown diagnostic test has failed. The control circuitry 22 may then stop sending signals to the driver circuitry 18. If, however, the pulse-test-result input 80 equals logical one, that indicates that the driver circuitry 18 was successfully disabled, and the process 92 continues to step 106 of the shutdown diagnostic test.

At step 106, the shutdown-command output 38 is set to zero. At step 108, the pulse-test-enabled output 72 is set to zero, thereby resetting the latch 54. Then, at step 110, the shutdown processor 38 reads the pulse-test result signal. At this time, the status output of the driver circuitry 18 will be logical one, indicating that the driver circuitry 18 is enabled. If the latch 54 has been successfully reset, the inverted output 76 of the latch 54 will also be logical one. If both of these conditions are true, the pulse-test input 80 will equal zero. Therefore, at step 112, if the pulse-test result input 80 equals one, the process 92 will proceed to step 114, wherein a full shutdown may be initiated by the shutdown processor 38 as described above, in relation to step 104. If however, the pulse-test result input 80 equals zero, the process 92 will proceed to step 116. At step 116 an indication that the shutdown diagnostic test has passed may be generated. In embodiments of the present invention, a specified time period may elapse before repeating the shutdown diagnostic test again, starting at step 94.

As discussed above, the purpose of the shutdown diagnostic test is to ensure that the shutdown circuitry 28 is capable of powering down the driver circuitry 18 if commanded to do so by the control circuitry 22. Accordingly, the shutdown processor 38 may also include a method for conducting a full shutdown. The accomplish this, the pulse-test-enable output 72, in addition to providing a technique for conducting a diagnostic test, also provides a technique for conducting a full shutdown.

To initiate a full shutdown, the control circuitry 22 may send a signal to the shutdown processor 38 through the full-shutdown-command input 90. In response, the shutdown processor 38 may first set the pulse-test-enable output 72 to low, thereby resetting the latch 54 and setting the output of the diodes 50 and 52 to the logical-one voltage. The shutdown processor 38 may then set the shutdown-command output 46 to logical one, thereby setting the disable input 47 to logical one and disabling the driver circuitry 18. If the driver circuitry 18 shuts down, the status output 56 may then go to logical zero, which is then relayed to the pulse-test-result input 80 to indicate to the shutdown processor 38 that the drier circuitry 18 is disabled. Meanwhile, the reset input 70 of the latch 54 continues to be held at logical zero by the pulse-test-enable output 72. Therefore, the output of the latch 54 does not change in response to the status output 56 from the driver circuitry 18. In this way, the shutdown circuitry 38 prevents the latch 54 from resetting the disable circuitry 40 or the driver circuitry 18.

Figure 6:
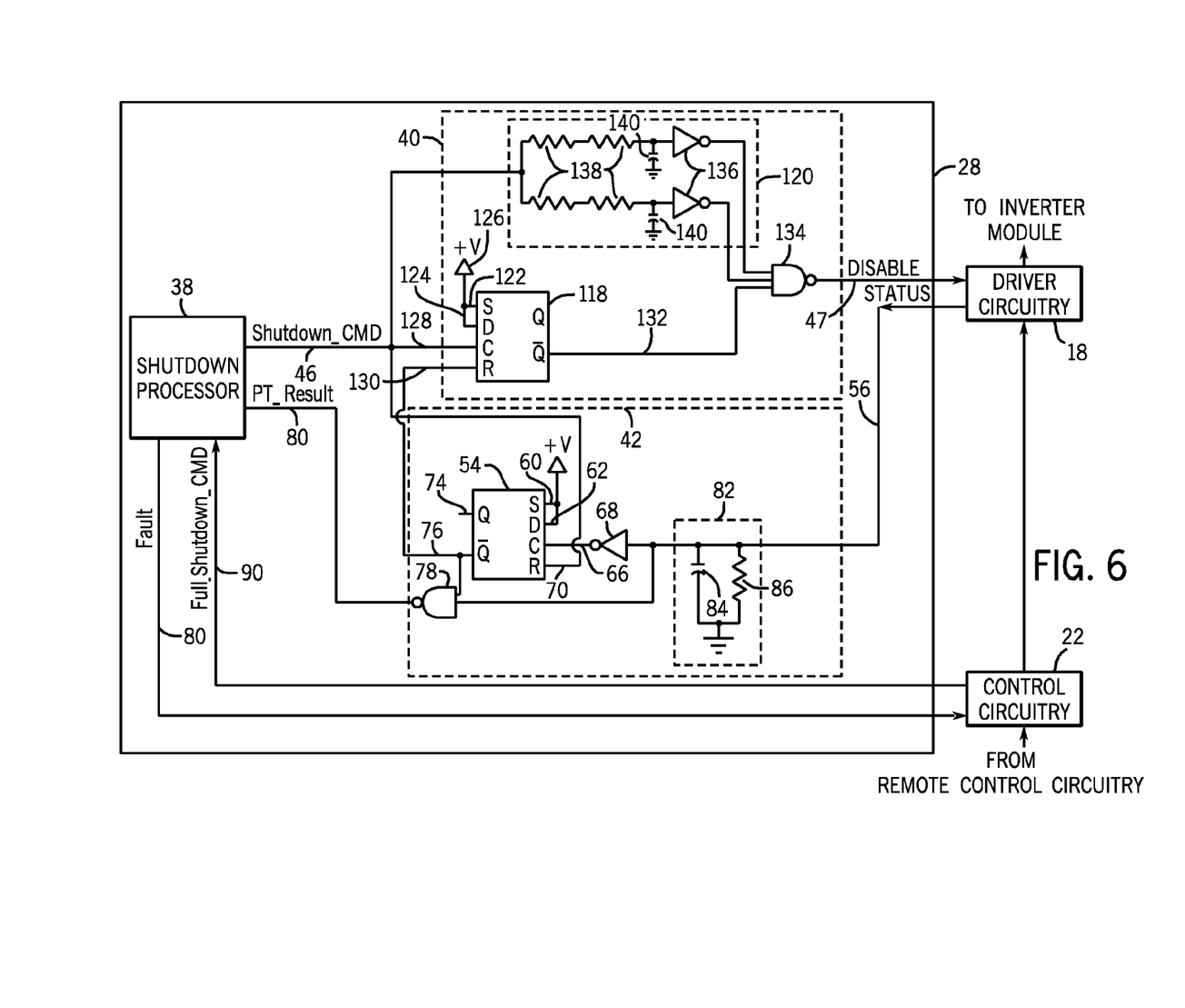
FIG. 6 is a detailed circuit diagram of another exemplary embodiment of the shutdown circuitry of FIG. 3.

FIG. 6 depicts another example of an exemplary shutdown circuitry 28. In the embodiments of FIG. 6, the shutdown-command output 46 of the shutdown processor 38 is used to initiate both the shutdown diagnostic test and the full shutdown. In this embodiment, the duration of the shutdown command from the shutdown-command output 46 determines whether a shutdown diagnostic test or a full shutdown is performed.

The result circuitry 42, as shown in FIG. 6, may be substantially the same as the result circuitry 42 shown in FIG. 4. However, in the embodiment shown in FIG. 6, the reset input 70 of the latch 54 is coupled to the shutdown-command output 46 of the shutdown processor 38. Therefore, if the driver circuitry 18 is successfully disabled and the status output 56 goes to logical zero, the latch 54 will send a power-up signal to the disable circuitry 40 even during a full shutdown. Therefore, in the embodiment shown in FIG. 6, the disable circuitry 40 is configured to provide a different response depending on whether a shutdown diagnostic test or a full shutdown is desired.

Accordingly, the disable circuitry 40 may include a test-pulse latch 118 and a full shutdown circuitry 120. Regarding the test pulse-latch 118, both the set input 122 and the data input 124 are coupled to a positive voltage 126 to provide a logical-one input, the clock input 128 is coupled to the shutdown-command output 46 of the shutdown processor 38, and the reset input 130 is coupled to the inverted output 76 of the latch 54. The inverted output of the latch 132 is coupled to the disable input 47 of the driver circuitry 18 through a NAND gate 134.

To perform a shutdown diagnostic test, the shutdown circuitry 38 may send a short duration shutdown test pulse to the test-pulse latch 118. Upon receiving the shutdown command from the shutdown circuitry 38, the clock input 128 will go to logical one, causing the inverted output 132 of the test-pulse latch 118 to go to zero. The output of the NAND gate 134 will then go high regardless of the other two inputs from the full shutdown circuitry 120, thus sending a disable signal to the driver circuitry 18. If the driver circuitry 18 is successfully disabled, the status output 56 will go to zero, and the clock input 66 of the latch 54 will go to logical one. The latch 54 will then store the result of the shutdown diagnostic test as discussed above, in relation to FIG. 4. Additionally, the latch 54 sends a power-up signal to the disable circuitry 40 by resetting the test-pulse latch 118, and the inverted output 132 will return to logical one, thus sending a re-enabling signal to the driver circuitry 18. After the shutdown processor 38 has processed the results of the shutdown diagnostic test, the shutdown-command output 46 may return to logical zero. In some embodiments, the duration of the shutdown-command pulse may be approximately two to three micro-seconds.

To perform a full shutdown, the shutdown processor 38 may output a longer duration pulse that is long enough to engage the full shutdown circuitry 120. The full shutdown circuitry 120 may include one or more inverters 136 in series with RC circuits that include one or more resistors 138 and one or more capacitors 140. In some embodiments, the full shutdown circuitry 120 may include one inverter 136, one resistor 138 and one capacitor 140. In other embodiments, several of these may be duplicated to provide redundancy and increased protection from circuit failure. Additionally, in some embodiments, the inverters 136 may be Schmitt-trigger inverters.

Upon receiving a logical-one voltage from the shutdown-command output 38, the capacitors 140 will charge and the input voltage to the inverters 136 will gradually increase over time. When the input of the inverters 136 reaches a certain threshold, the output of the inverters will flip to logical zero, thus sending a disable signal to the driver circuitry 18 via the NAND gate 134 regardless of the output of the test-pulse latch 132. In this way, a longer duration shutdown command from the shutdown processor may produce a full shutdown. To avoid interfering with the shutdown diagnostic test, the response time of the full shutdown circuitry 120 is configured so that the shutdown diagnostic test may be completed before the input voltage of the inverters 136 is high enough to cause them to change state. In some embodiments, the response time of the full shutdown circuitry 120 may be greater than approximately thirty micro-seconds and may be approximately fifty micro-seconds.

It will be appreciated that the circuits depicted in FIGS. 4 and 6 are exemplary embodiments only, and that various changes may be made to the circuitry shown while still falling within the scope of the present invention. For example, the shutdown circuitry 38 may also include various signal conditioning circuits such as buffers, as well as pull-up and/or pulldown circuits for adapting the voltages used by the various circuit elements and processors to one another other. Additionally, various RC circuits may be used to delay certain signals to achieve the proper timing between components. To increase the stability and noise resistance of the shutdown circuitry 28, one or more of the electrical components described herein may be Schmitt trigger devices. Furthermore, various circuit components may be duplicated to provide redundancy to reduce the likelihood of circuit failure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A motor control system, comprising:
   an inverter module comprising a solid state switch configured to generate an output power waveform for powering the motor;
   driver circuitry communicatively coupled to the inverter module and configured to activate and deactivate the solid state switch for generating the output power waveform;
   shutdown circuitry coupled to the driver circuitry and configured to disable the driver circuitry; and
   control circuitry coupled to the driver circuitry and the shutdown circuitry and configured to communicate with the driver circuitry and the shutdown circuitry;
   wherein the shutdown circuitry is configured to perform a shutdown diagnostic test that verifies the ability of the shutdown circuitry to disable the driver circuitry by disabling the driver circuitry for a time period that is short enough to prevent the solid state switch from changing state.

2. The motor control system of claim 1, comprising an input device electrically coupled to a gate of the solid state switch and configured to receive an input pulse from the driver circuitry and send a corresponding output pulse to the solid state switch to turn on the solid state switch, wherein the input device imparts a time delay between a termination of the input pulse and a termination of the output pulse, and wherein the shutdown circuitry is configured to generate a test pulse that disables the driver circuitry for a time period that is shorter than the time delay.

3. The motor control system of claim 2, wherein the input device comprises an opto-coupler.

4. The motor control system of claim 1, wherein the shutdown circuitry comprises a shutdown processor configured to conduct the shutdown diagnostic test, disable circuitry configured to receive a shutdown command from the shutdown circuitry and send a corresponding test pulse to the driver circuitry, and result circuitry configured to receive a status signal from the driver circuitry indicating whether the driver circuitry is enabled or disabled.

5. The motor control system of claim 4, wherein the result circuitry includes a first latch and wherein an output of the first latch is coupled to the disable circuitry and configured to re-enable the driver circuitry upon receiving the status signal from the driver circuitry.

6. The motor control system of claim 4, wherein the result circuitry stores the status signal from the driver circuitry until the shutdown processor has processed the results of the shutdown diagnostic test.

7. The motor control system of claim 4, wherein the result circuitry includes pulse conditioning circuitry configured to increase a duration of the test pulse.

8. The motor control system of claim 4, wherein the disable circuitry includes a second latch, wherein the output of the second latch is configured to initiate the test pulse, and wherein the output of the first latch is configured to terminate the test pulse.

9. The motor control system of claim 4, wherein the disable circuitry includes a full shutdown circuitry configured to disable the driver circuitry in response to a shutdown command that persists for a specified duration.

10. The motor control system of claim 4, wherein the disable circuitry comprises an AND-gate with a first input coupled to a shutdown-command output of the shutdown processor and a second input coupled to an output of the first latch.

11. The motor control system of claim 10, wherein the shutdown processor includes a pulse-test-enable output coupled to the reset input of the first latch, wherein the pulse-test-enable output is configured to determine whether a full shutdown or a shutdown diagnostic test is performed and whether the shutdown circuitry is functioning properly.

12. The motor control system of claim 10, wherein the pulse-test-enable output is configured to cause a full shutdown by holding the first latch in a reset mode while sending the shutdown command to the driver circuitry.

13. A method of operating a motor drive, comprising:
sending signals from a control circuitry to a driver circuitry;
sending drive pulses from the driver circuitry to an inverter input device;
sending output pulses corresponding to the drive pulses from the inverter input device to a solid state switch to generate an output power waveform; and
performing a test configured to temporarily disable the driver circuitry;
wherein the inverter input device causes a time delay between a termination of the drive pulses input and a termination of the output pulses, and wherein duration of the test is shorter than the time delay.

14. The method of claim 13, wherein the inverter input device includes an opto-coupler.

15. The method of claim 13, wherein performing the test comprises:

sending a shutdown command from a shutdown processor to a disable circuitry;
sending a disable command corresponding to the shutdown command from the disable circuitry to the driver circuitry;
sending a status signal from the driver circuitry to a result circuitry;
sending a power-up command from the result circuitry to the disable circuitry;
sending a re-enable command from the disable circuitry to the drive circuitry.

16. The method of claim 13, wherein the test is approximately fifty to one hundred fifty nano-seconds in duration.

17. The method of claim 13, comprising receiving a status signal from the driver circuitry in response to the test, storing the status signal in a result circuitry, and sending the status signal from the result circuitry to the shutdown processor.

18. A method of performing a shutdown diagnostic test in a motor drive, comprising:
receiving a full shutdown command from a motor control circuitry;
sending a pulse-test-enable command from a processor to a reset input of a latch, the pulse-test-enable signal enabling the latch to change state in response to a clock input of the latch;
sending a shutdown command from the processor to a disable circuitry;
sending a disable command from the disable circuitry to a driver circuitry in response to the shutdown command;
sending a status indicator from the driver circuitry to the clock input of the latch in response to the disable command, the status indicator causing the latch to change state; and
sending a power-up command from the latch to the disable circuitry, the power-up command over-riding the shutdown command from the processor.

19. The method of claim 18, comprising sending a test-result indicator corresponding to the status indicator from the latch to the processor.

20. The method of claim 19, comprising sending a fault indicator from the processor to the motor control circuitry if the test-result indicator indicates a failure to disable the driver circuitry.

21. The method of claim 18, comprising:
terminating the pulse-test-enable command from the processor, thereby causing the latch to reset;
terminating the shutdown command from the processor, thereby causing the driver to be re-enabled;
sending a test-result indicator from an output of a NAND-gate to the processor, wherein a first input of the NAND-gate receives the status indictor and a second input of the NAND-gate receives an output of the latch.

22. A method of performing a diagnostic test in a motor drive, comprising:
sending a disable signal from a control circuitry to a driver circuitry, the disable signal causing the driver circuitry to stop sending drive signals to an inverter module;
receiving a status signal from the driver circuitry, the status signal indicating that the driver circuitry has been disabled; and
sending a re-enable signal to the driver circuitry that causes the driver circuitry to resume sending drive signals to the inverter module;
wherein the re-enable signal is sent to the driver circuitry before the inverter module disrupts the sending of power to the motor in response to the disable signal.

* * * * *